United States Patent [19]

Lin

[11] Patent Number: 5,828,380
[45] Date of Patent: Oct. 27, 1998

[54] METHOD FOR PROCESSING IMAGES

[75] Inventor: Tsung-Wei Lin, Taipei, Taiwan

[73] Assignee: Elead Systems, Inc., Taipei, Taiwan

[21] Appl. No.: 752,468

[22] Filed: Nov. 19, 1996

[30] Foreign Application Priority Data

Jul. 24, 1996 [TW] Taiwan ................................ 85109016

[51] Int. Cl.⁶ .................................................... G06F 15/00
[52] U.S. Cl. .......................................................... 345/441
[58] Field of Search ................................... 345/429, 432, 345/441, 470, 128, 129, 130

[56] References Cited

U.S. PATENT DOCUMENTS 5,499,324 3/1996 Nakayama ............................... 395/129
5,633,991 5/1997 Hakaridani et al. ..................... 395/110

Primary Examiner—Phu K. Nguyen
Attorney, Agent, or Firm—Friedman Siegelbaum LLP

[57] ABSTRACT

A method for effectively and conveniently processing images includes the steps of: providing an original image having a first set of coordinate points, wherein the points respectively have digital data; defining the original image as a connection of edges approximating the original image, wherein endpoints of the edges are a second set of coordinate points; performing a first operation on the first and second sets of coordinate points to obtain a relation map function corresponding to the first set of coordinate points; performing a second operation on the digital data of the first set of coordinate points associated with the relation map function to process the original image.

8 Claims, 13 Drawing Sheets

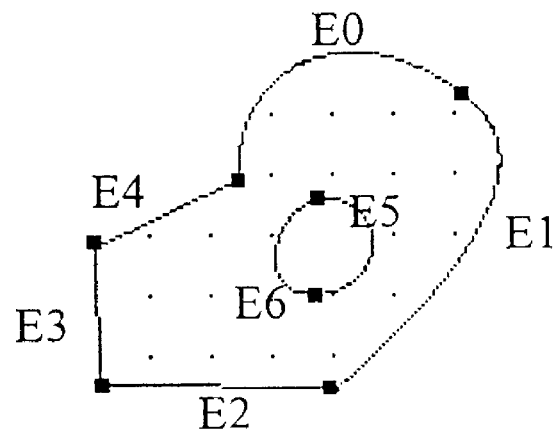
Fig. 4a
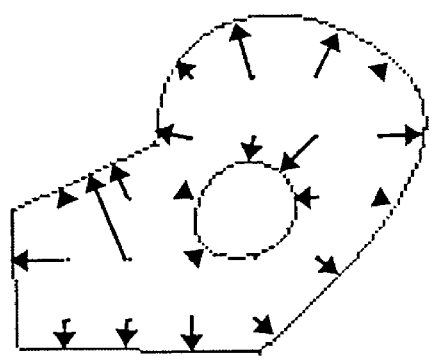 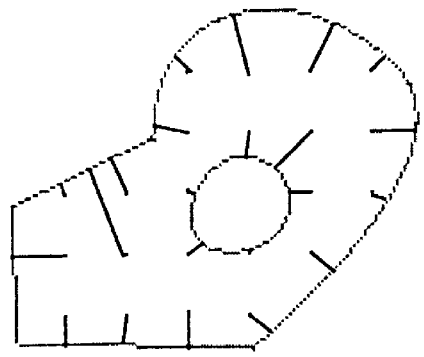
Fig. 4b          Fig. 4c

METHOD FOR PROCESSING IMAGES

FIELD OF THE INVENTION

The invention relates to a method for processing images, and more particularly to a method for digitally processing images.

BACKGROUND OF THE INVENTION

Nowadays, industry utilizes various digital image-processing methods for creating different image effects. To execute the digital image processing, the image is first reduced to digitized numbers, which can be manipulated by the computer means. Every number represents certain values (such as brightness value) at a particular location, which is generally called a pixel.

In the field of computer graphics, on a two-dimensional image, to digitally execute image process'g is common and convenient. Referring to Figs. 1a & 1b, after image processing, the three-dimensional effect based on the two-dimensional original image is shown.

The conventional method for achieving the three-dimensional effect uses the polygonal approach. That is, by computer calculation, the two-dimensional original image is divided into plural polygons by straight lines. Then, by interpolation, the color values of the pixels in the polygons are changed to obtain the desired visual effect. Generally speaking, the two-dimensional original image is usually composed of smooth curves of polynomials and the smooth and gradual visual effect is usually desired. Whereas, the effect of conventional method using plural polygons to change the color values of the pixels is not so satisfactory. For example, if we do not use enough polygons (as shown in FIG. 2a), the zigzag distortion will happen on the lines corresponding to the curves of the two-dimensional original image (as shown in FIG. 2b). Thus, the visual effect is adversely affected.

In another way, if we increase the applied polygons to avoid the above-mentioned problem, the processing time will be considerably increased. Additionally, if different kinds of visual effects are desired on a two-dimensional original image, every corresponding dividing ways may be accordingly different and the processing time can be also increased.

From the above it is seen that a time-saving and convenient method for processing images to obtain a satisfactory effect is often desired.

SUMMARY OF THE INVENTION

One objective of the present invention is to provide an image=processing method for producing a satisfactory visual effect.

Another objective of the present invention is to provide a convenient method for processing images.

A further objective of the present invention is to provide a time-saving method for processing images.

In a specific embodiment, the present invention provides a method for digitally processing an original image in an image processing system having a display, including the steps of:

(1) providing the original image having a first set of coordinate points, wherein the points respectively have digital data;

(2) defining the original image as a connection of edges approximating the original image, wherein endpoints of the edges are a second set of coordinate points;

(3) performing a first operation on the first and second sets of coordinate points to obtain a relation map function corresponding to the first set of coordinate points; and (4) performing a second operation on the digital data of the first set of coordinate points associated with the relation map function to process the original image.

Certainly, the first set of coordinate points can be a set of pixels on the display and the digital data includes color value data. The second set of coordinate points can be selected from the pixels located close to points of the first set but not points of the first set. The display can be a display monitor.

Certainly, the first operation can include steps of:

(3a) obtaining a distance from every pixel of the first set to the corresponding edge located closest thereto; and (3b) obtaining the relation map function representing the distance from every pixel of the first set to the corresponding edge located closest thereto.

Certainly, the second operation can include the steps of:

(4a) providing an effect on relation map function;

(4b) inputting the color value data of every pixel of the first set and its corresponding relation map function into the effect on relation map function to change the color value data of every pixel of the first set; and (4c) replacing the original color value with the changed color value data.

Alternatively, the first operation can include the steps of:

(3a) obtaining a vector from every pixel of the first set to the corresponding edge located closest thereto; and (3b) obtaining the relation map function representing the vector from every pixel of the first set to the corresponding edge located closest thereto;

Alternatively, the second operation can include the steps of:

(4a) providing an effect on relation map function;

(4b) inputting the color value data of every pixel of the first set and corresponding relation map function into the effect on relation map function to change the color value data of every pixel of the first set; and (4c) replacing the original color value with the changed color value.

The forgoing and other objects, features, and advantages of the invention will be apparent from the following more particular description of a preferred embodiment of the invention, as illustrated in the accompanying drawings.

BRIEF DESCRIPTION OF THE DRAWING

FIG. 4a schematically shows a defined connection of the edges based on an original image according to the present invention;

FIG. 4b schematically shows a relation between the seeds and the edges according to the present invention;

FIG. 4c schematically shows another relation between the seeds and the edges according to the present invention;

DETAILED DESCRIPTION OF THE PREFERRED EMBODIMENT

Figure 1A:
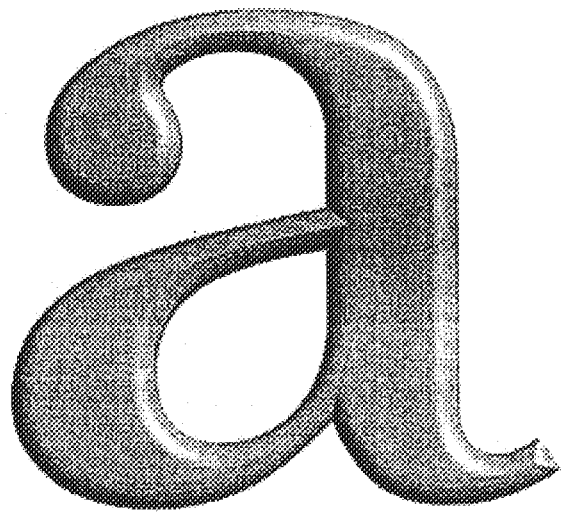
Figs. 1a & 1b show general visual effects on an two-dimensional original image.
Figure 1B:
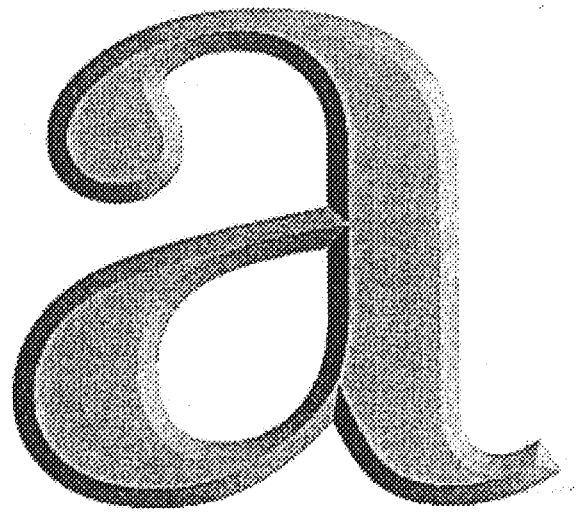
Figure 2A:
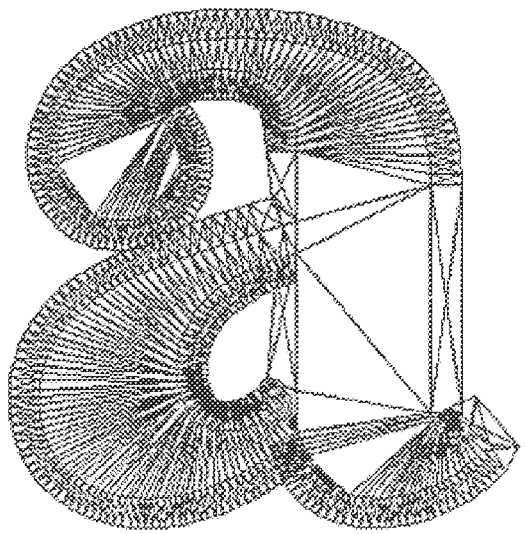
FIG. 2a shows the polygonal approach for image processing.
Figure 2B:
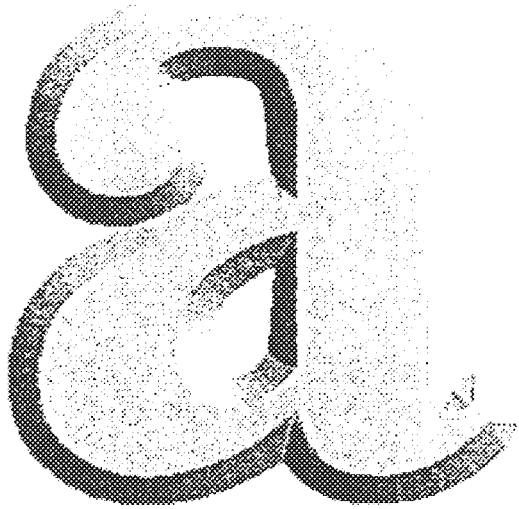
FIG. 2b shows one drawback of the conventional method for digitally processing images.
Figure 3:
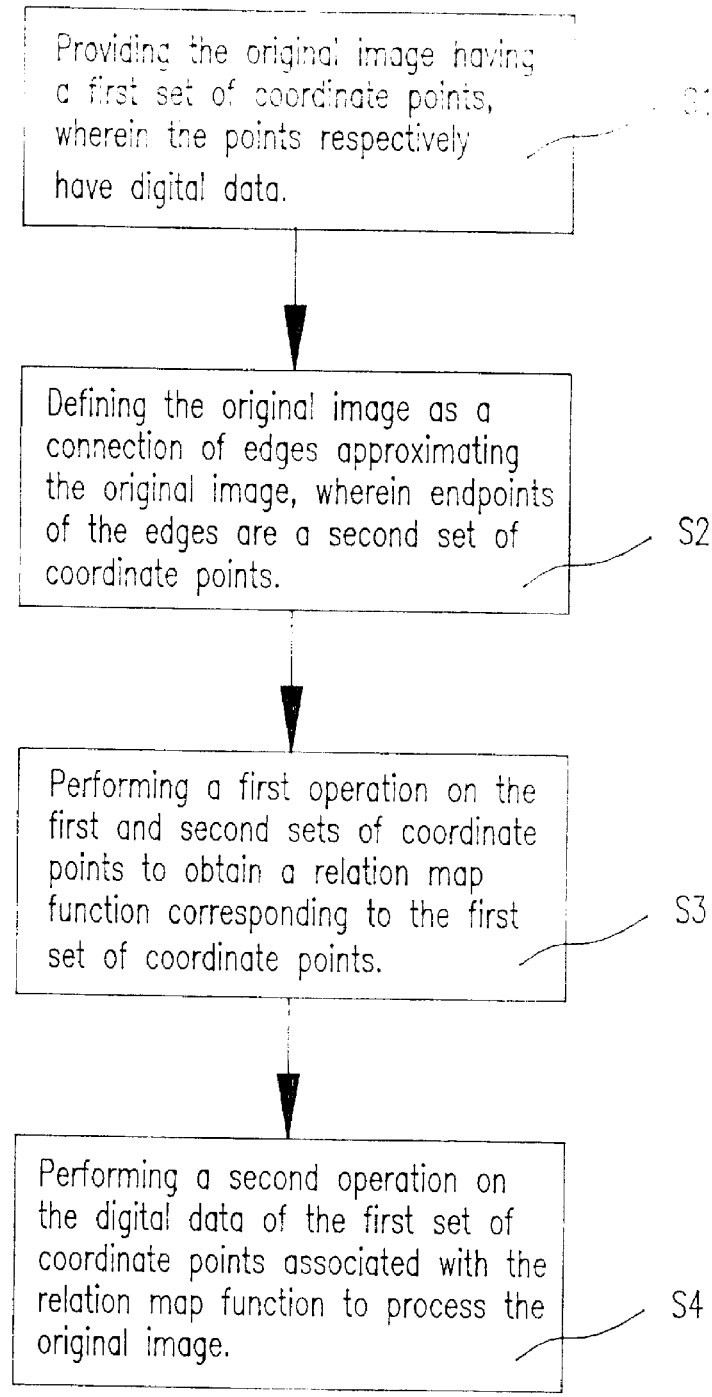
FIG. 3 schematically shows the flow chart according to the present invention.

FIG. 3 schematically shows the flow chart according to the present invention. The present method includes (S1) providing the original image having a first set of coordinate points, wherein the points respectively have digital data;

(S2) defining the original image as a connection of edges approximating the original image, wherein endpoints of the edges are a second set of coordinate points;

(S3) performing a first operation on the first and second sets of coordinate points to obtain a relation map function corresponding to the first set of coordinate points;

(S4) performing a second operation on the digital data of the first set of coordinate points associated with the relation map function to process the original image.

Referring to FIG. 3 and FIG. 4a, the preset method can be outlined as follows.

(a) CREATING 2-D SHAPE:

First, the two-dimensional original image shown in FIG. 4a can be defined as connected strait lines and/or curved edges (for example, cubic polynomials) to create the 2-D shape (two-dimensional shape). For example, the two-dimensional original image shown in FIG. 4a is defined as the connection of the edges E0, E1, E2, E3, E4, E5, and E6. Every pixel inside the created 2-D shape is defined as a "seed".

(b) CREATING RELATION MAP:

A Relation Map (RM) function can be defined as the relation between the seeds and the related local edges nearby.

FIG. 4b shows a relation between the seeds and the edges. It is represented by the vector pointing from the seed to the edge located closest thereto. Through the coordinates of the seeds and the relation between the seeds and the edges, a Relation Map function can be obtained.

FIG. 4c shows another relation between the seeds and the edges. It is represented by the distance from the seed to the edge located closest thereto. Through the coordinates of the seeds and the relation between the seeds and the edges, a Relation Map function can also be obtained.

(c) CREATING VISUAL EFFECTS:

By way of the Relation Map function and the Effect on Relation Map (ERM) function, the visual effect can be created.

For the Relation Map function representing the relation of the distances from the seeds to the edges located closest thereto, the image processing is described as follows.

The Relation Map function can be represented by $F(x,y)$, wherein $(x, y)$ indicates the coordinates of the seed. The distance from the seed to the edge located closest thereto is represented by $d=F(x,y)$.

Figure 5:
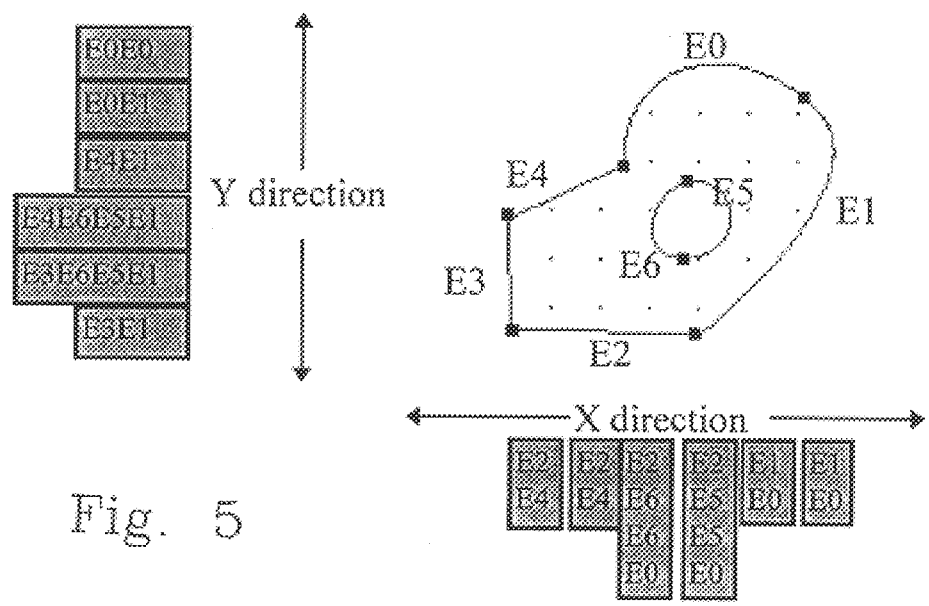
FIG. 5 schematically shows a two-dimensional edge list after x-axis and y-axis scannings according to the present invention.

FIG. 5 schematically shows a two-dimensional edge list after x-axis and y-axis scannings according to the present invention. It means that edges intersecting with the straight lines of the same x coordinate or the same y coordinate are collected. The two-dimensional edge lists are therefore obtained. In another way, the value $d_{max}$ means the maximum d value. It indicates the distance from the effect-generating place to the farthest edge.

Figure 6:
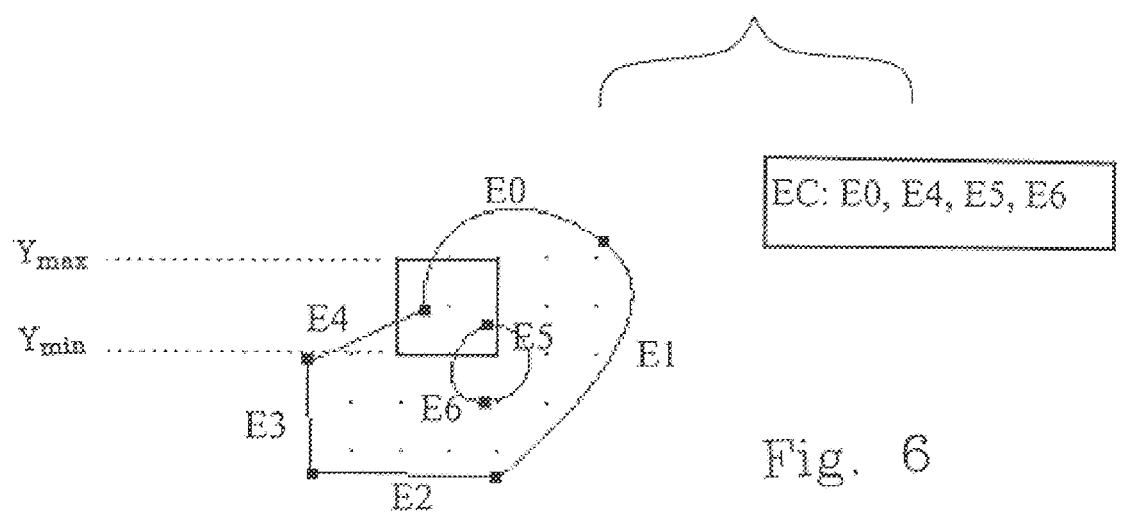
FIG. 6 schematically shows Edge candidates of a pixel after box filtering according to the present invention.

By the above-mentioned two-dimensional edge list, for every pixel as a center, we define a square with sides of $2d_{max}$ (a box with sides of $2d_{max}$). The edges appearing in the square are called the edge candidates (EC) of the pixel. This above step is also called box filtering. Referring to FIG. 6, the edges E0, E4, E5, and E6 are shown.

The edge candidates are then sorted according to the distances from the pixel to the edge candidates. The edge candidate of the shortest distance and the edge candidate of the next shortest distance are first obtained. The difference thereof is then obtained. If the difference is smaller than that of two neighboring pixels, a proper distance value is obtained by weighted interpolation, which will be a d value corresponding to that pixel. Thus, the color values are adjusted on the border of the effects (for example, the border of two colors) and the anti-aliasing purpose is achieved. If the difference is larger than that of the neighboring pixels, the shortest distance is the d value corresponding to that pixel. Therefore, all d values corresponding to pixels are obtained, and Relation Map F(x,y) is also obtained. Certainly, for achieving better visual effect, the step of judging whether the difference is smaller than that of the neighboring pixels can be spared. That is, the difference of the Edge candidate of the shortest distance and the Edge candidate of the next shortest distance is first calculated. Then, by weighted interpolation, a proper d value corresponding to that pixel is obtained. The anti-aliasing effect is more obvious.

The above method uses a lot of calculations to obtain the corresponding d values. Whereas, the following second method to obtain the Relation Map function is more faster.

Figure 18:
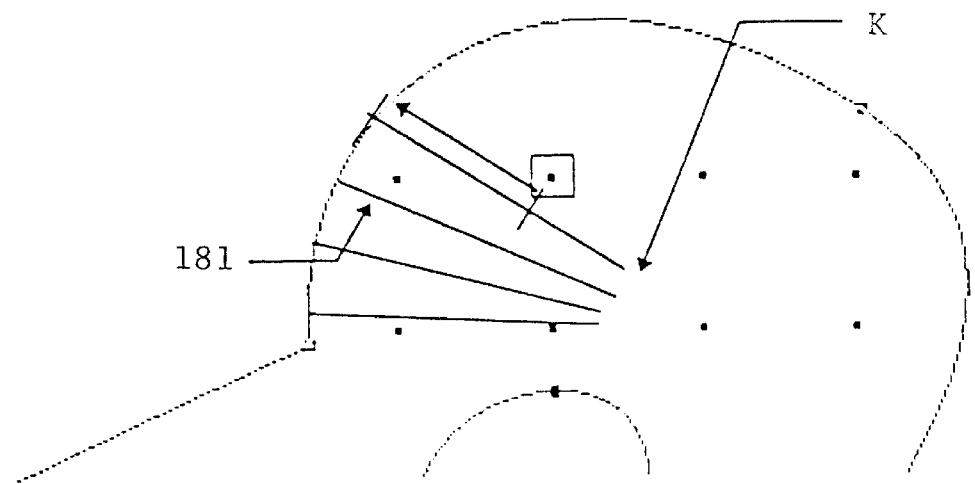
FIG. 18 schematically shows a normal segment approach to obtain the Relation Map function according to the present invention.

Referring to FIG. 18, along the entire edge of the two-dimensional original image, we use the well-known subdivision algorithm to recurrently subdivide the edge. Then normal lines 181 corresponding to all subdividing points are formed along the entire edge and toward the interior of the original image. These normal lines are also called "normal segments", and the length of these normal segments is $d_{max}$, which means the distance from the effect-generating place to the farthest edge. The endpoints K of the normal segments are also shown in FIG. 18. The subdividing step does not stop until all pixels in the two-dimensional original figure are considered and covered.

Then, alone every normal segment, the scanning is executed. Because the distance from the intersection point of the normal segment and the edge to one point on the normal segment is the d value (and/or vector v) corresponding to the point on the normal segment, the d value (and/or vector v) of other pixels located close to the above-mentioned pixel is replaced by the d value (and/or vector v) of the above-mentioned pixel to rapidly obtain the Relation Map function F(x,y). Whereas, the subdividing normal segments cannot pass through every pixel in the two-dimensional original image, the above replacing step will result in some errors.

Figure 19:
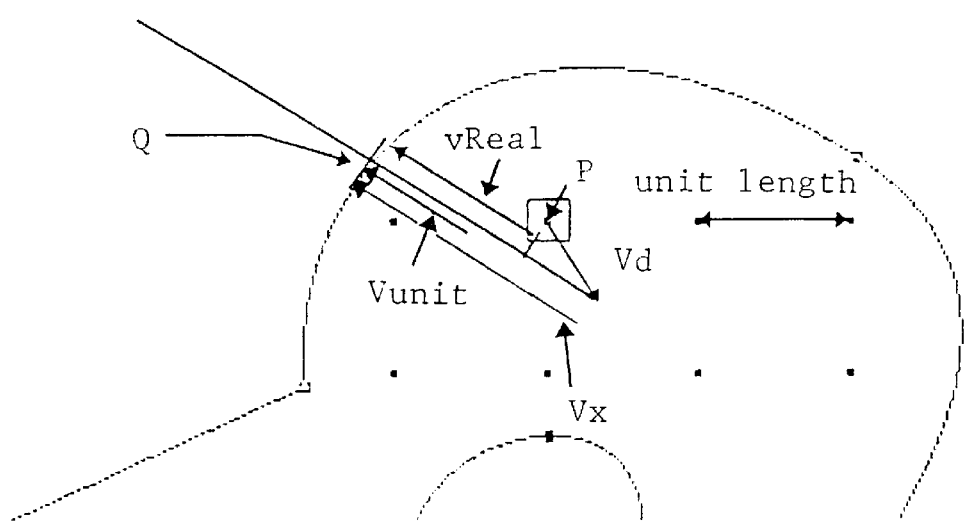
FIG. 19 schematically shows a modified normal segment approach to obtain the Relation Map function according to the present invention.

FIG. 19 schematically shows a modified normal segment approach to obtain the Relation Map function according to the present invention. The vector from the pixel P to the edge should be $V_{real}$. The unit vector located closest to the pixel P is $V_{unit}$. The vector from the pixel P to the endpoint of the normal segment located closest to the pixel P is $V_d$. The vector from the intersection point Q of the normal segment and the edge to the endpoint of the normal segment is $V_x$. Therefore, we can obtain $V_{real}=V_x-V_{unit}\times$DotProduct $(V_{unit}-V_d)$.

It is possible that the same pixel can be defined by more than one normal segment. When the difference of the smallest d value and the next smallest d value is smaller than 0.5 unit length (the distance of the neighboring pixels) and the angle therebetween is larger than 90 degrees, the weighted interpolation can also be applied to obtain a proper d value. The anti-aliasing purpose can also be achieved.

The above method applies the subdivision algorithm to divide the entire edge. The number of the dividing normal segments has to be large enough to cover every pixel in the two-dimensional original image. The more the dividing steps, the better the visual effect. Whereas, the processing time is also increased. Based upon the experimental results, we can conclude that:

1) If the edge is a straight line, the distance of the endpoints of the two neighboring normal segments is to be not more than 0.5 unit length.
2) If the edge is a cubic polynomial, the distance of the endpoints of the two neighboring normal segments is to be between 0.3 to 0.35 unit length.

Figure 7:
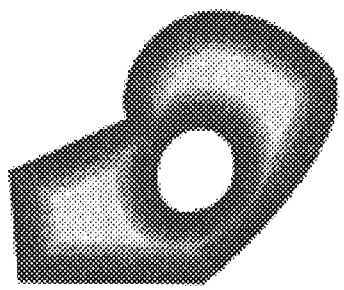
FIG. 7 schematically shows the gradual change of the color on the three-dimensional image after image processing according to the present invention.

After the Relation Map function F(x,y) is obtained, the Effect on Relation Map (ERM) can also be executed according to the obtained Relation Map function. Taking FIG. 7 for example, the pixel corresponding to a smaller d value in the Relation Map F(x,y) is defined to have a deeper color. When the d value becomes bigger, the pixel corresponding to the bigger d value in the Relation Map is therefore defined to have a lighter color. In other words, it means that two Relation Maps of the same d value have the same color. Certainly, other effects such as color variation can also be obtained in the similar way. If the effect on gradual change of the color is desired, the color value on the pixel can be multiplied by a normalized d value (i.e., $d_{normal}$, $d_{normal}=d/d_{max}$). In addition, the methods to add effects on the original figure are not limited. We can even apply plural effects on the same original image to obtain the combined effect.

Figure 8:
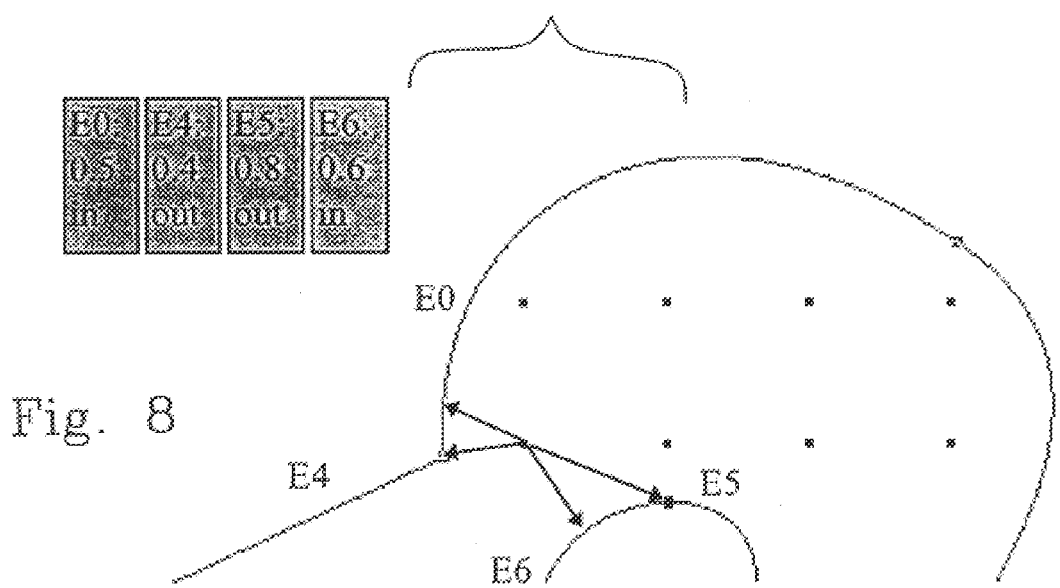
FIG. 8 schematically shows in/out parameters of the Edge candidates according to the present invention.

Now referring to FIG. 8, if the square with sides of $2d_{max}$ covers the intersection of the straight lines and/or curves, the problem in the calculation of the edge candidates and the d value will be generated. Thus, during the sorting process, it is better to add an in or out parameter. For example, if the point located closest to the pixel is located on the endpoint of the edge candidate (i.e., the intersection of the two lines), the parameter for the edge candidate is defined as "out". On the other way, if the point located closest to the pixel is not located on the endpoint of the edge candidate, the parameter for the edge candidate is defined as "in".

Figure 9:
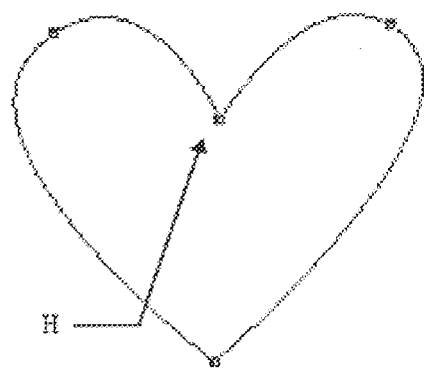
FIG. 9 shows another two-dimensional original image according to the present invention.

For processing the original figure shown in FIG. 9 (the parameters for the edge candidate closest to the point H and the next closest to the point H are both "out"), we can execute different methods.

Figure 10A:
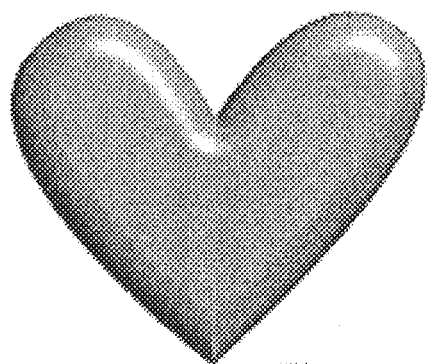
Fig. 10a is a partial enlarged view of FIG. 10.
Figure 10B:
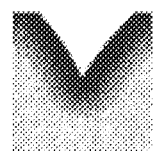
FIG. 10 shows the visual effect on a two-dimensional original image without considering the in/out parameters of the Edge candidates according to the present invention.
Figure 11A:
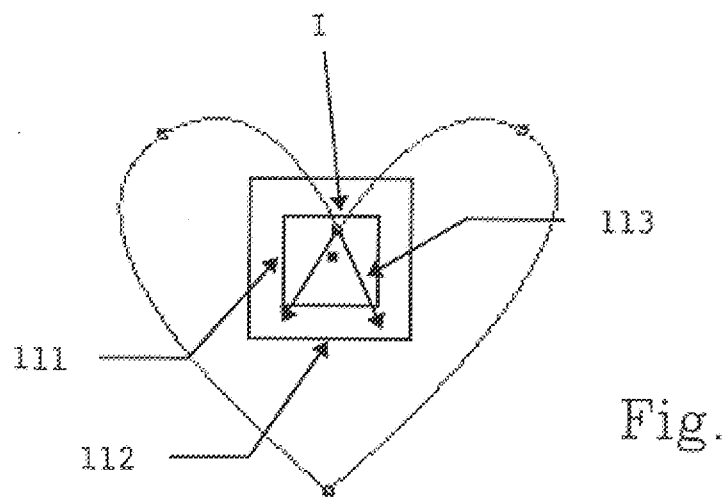
FIG. 11a schematically shows the edge candidates of a pixel after box filtering with consideration of the in/out parameters of the Edge candidates according to the present invention.
Figure 11B:
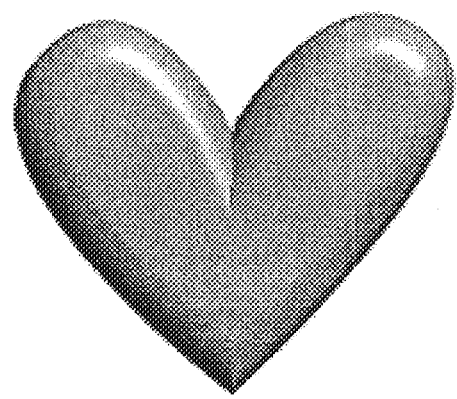
FIG. 11b shows the visual effect on a two-dimensional original image with consideration of the in/out parameters of the Edge candidates according to the present invention.
Figure 11C:
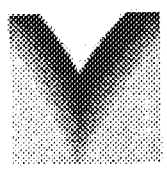
FIG. 11c is a partial enlarged view of FIG. 11b.

1) Without considering in/out parameter, as mentioned previously, according to the distances from the pixel to the edge candidates, the sorting process is executed and the d value of the pixel is obtained. The final effect is shown in FIGS. 10 & 10a.
2) Considering the in/out parameter, when at least one of the parameters for the edge candidate located closest to the pixel and the edge candidates located next closest to the pixel is "in", the process is the same as the above method. When both parameters for the edge candidate located closest to the pixel and the edge candidate located next closest to the pixel are "out", for the original box 111, first we enlarge the sides of the square to obtain an enlarged box 112, then extend the lines 113 intersecting on the point (as shown in FIG. 11a). After the shortest distance between the pixel and the extended lines is obtained, the corresponding d value is also obtained. The final effect is shown in Figs. 11b & 11c. The side of the enlarged square, k, equals to $2d_{max}/[2(1-\cos\theta)]^{1/2}$, wherein $\theta$ is the angle between two extended lines.

Additionally, in the alternative faster method, we also have the same problem in the intersection of the straight line and/or the curve. In the same way, we can obtain different effects by different considerations.

Figure 20A:
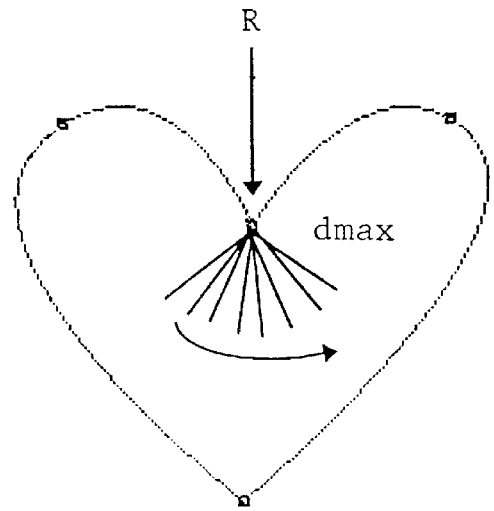
FIGS. 20a and 20b schematically show another modified normal segment approach to obtain the Relation Map function according to the present invention.
Figure 20B:
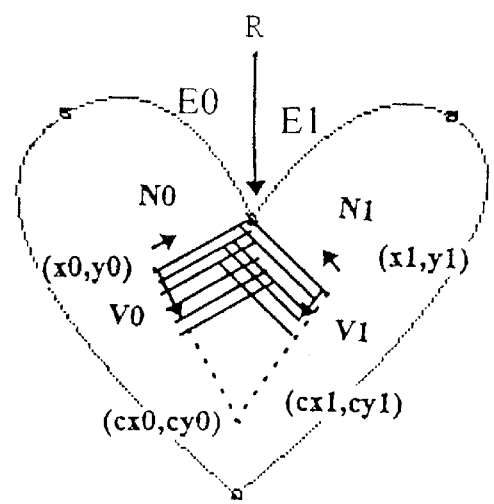

1) Referring to FIG. 20a, the intersection of E0 and E1 is set to be the center of the circle, and $d_{max}$ is set to be the diameter. Thus, the area where the edge normal segments do not cover will be compensated, and we will obtain the visual effect the same as the one shown in FIG. 10.
2) Referring to FIG. 20b, along the edges $E_0$ and $E_1$, the normal segments of length $d_{max}$ are generated. On the intersection of $E_0$ and $E_1$, R. two segments are formed. One segment has endpoints R and $(X_0, Y_0)$. The other segment has endpoints R and $(X_1, Y_1)$. We define the two segments as the vectors $N_0$ and $N_1$. The area between the two vectors $N_0$ and $N_1$ is not covered by the edge normal segments. For covering the above-mentioned area, we produce normal segments of length $d_{max}$, parallel to $N_0$ and $N_1$ and along the $V_0$ and $V_1$ directions, wherein $V_0$ and $V_1$ are respectively directional vectors of E0 and E1 at point R. These normal segments are not produced when the endpoints ($cx_0$, $cy_0$) and ($cx_1$, $cy_1$) of the related normal segments coincide. Along $V_0$ direction and parallel to the vector $N_0$, the number of the produced normal segments of $d_{max}$ length is $k_0$. Along $V_1$ direction and parallel to the vector $N_1$, the number of the produced normal segments of $d_{max}$ length is $k_1$. The number of the normal segments can be shown by the following:

$$k_0=[cx_1(y_0-y_1)-cy_1(x_0-x_1)]/[cy_1 \cdot cx_0-cx_1 \cdot cy_0];$$

and $$k_1=[cx_0(y_1-y_0)-cy_0(x_1-x_0)]/[cy_0 \cdot cx_1-cx_0 \cdot cy_1].$$

Figure 12:
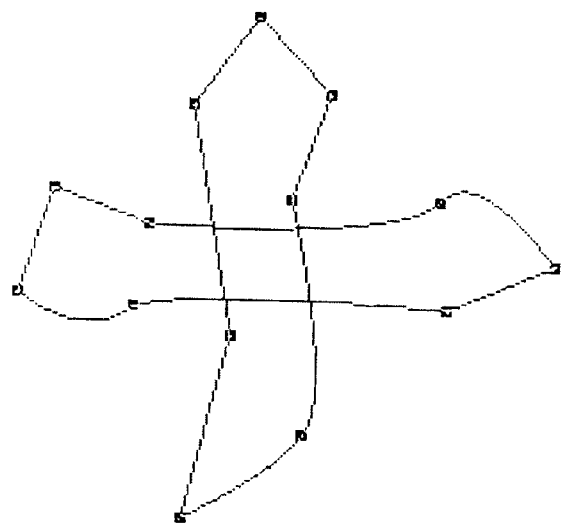
FIG. 12 shows another two-dimensional original image according to the present invention.
Figure 13A:
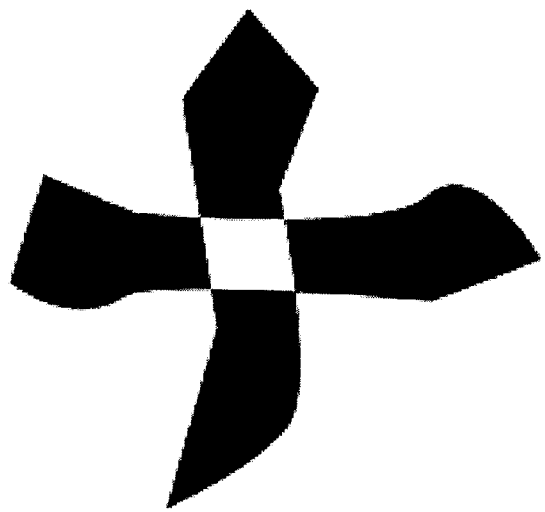
FIG. 13a schematically shows an even-odd rule to obtain a defined shape corresponding to the two-dimensional original image according to the present invention.
Figure 13B:
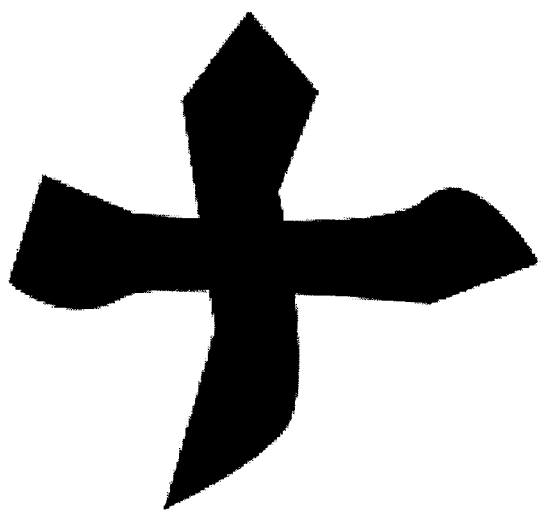
FIG. 13b shows a non-zero filling rule to obtain a defined shape corresponding to the two-dimensional original image according to the present invention.

With respect to the Chinese or other characters, a method is also proposed to deal with the superimposition situation (that is, the overlap of the segments of the Chinese characters, Japanese characters, etc.). Referring to FIG. 12, the two-dimensional original image includes two sets of closed loops. Each loop is composed of straight lines and curves. The two-dimensional original image can be defined by different filling rules to define different two dimensional shape. FIG. 13a shows the two dimensional shapes defined according to the even-odd filling rule. FIG. 13b shows the two dimensional shapes defined according to the non-zero winding rule. Apparently, it is better to apply the non-zero winding rule to define the two-dimensional original image.

According to this filling rule, the edges corresponding to the overlapped portion of the two loops are abnormal (when an x-axis and a y-axis scanning are executed to establish a two-dimensional edge list, an judgment to decide whether the line is the edge of the original image is an additional step), but the other edges are normal. After we obtain the edge candidates by the above two-dimensional edge list and then the Relation Map function, two situations will happen.

Figure 14:
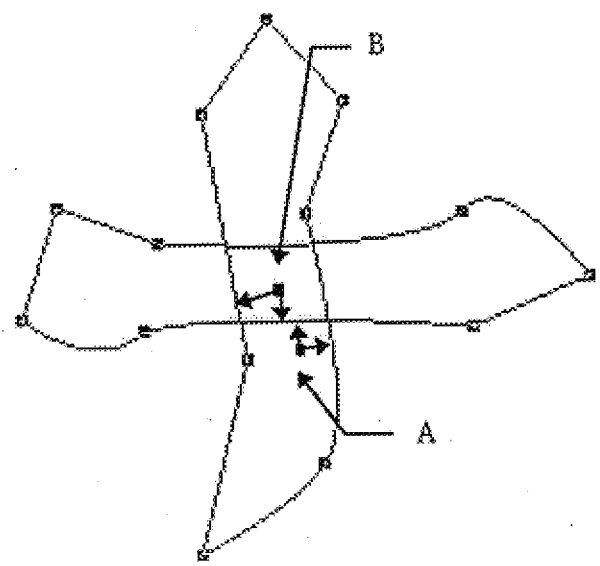
FIG. 14 schematically shows two kinds of pixels upon obtaining Relation Map functions according to the present invention.

1) After one pixel is processed by the box filtering, if at least one of the generated edge candidate belongs to the normal edges (for example, point A in FIG. 14), the normal edge candidate of the shortest distance is the first item for sorting. The edge candidates of the shortest edge and the next shortest distance are then obtained.

Figure 15:
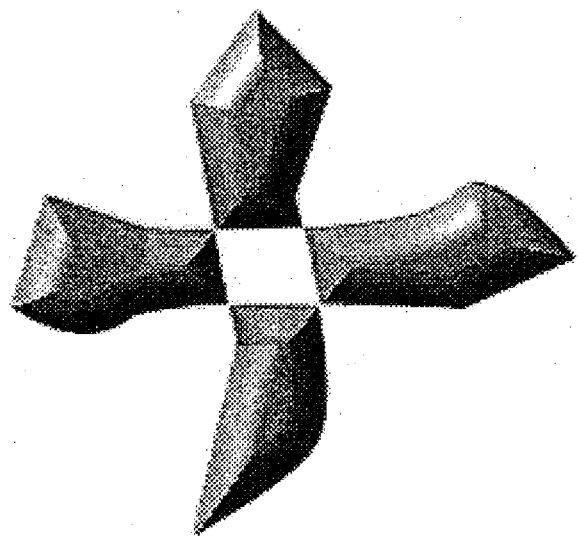
FIG. 15 shows the visual effect by way of the non-zero winding filling rule according to one preferred embodiment of the present invention.

2) After one pixel is processed by box filtering, if all generated edge candidates do not belong to the normal edges (for example, point B in FIG. 14), the intersection point of every edge candidate and the normal segment of the shortest distance (formed by the pixel and the edge candidate) is to be obtained. The edge candidate which the intersection point located closest to the normal edge belongs to is the first item for sorting. After the edge candidates of the shortest distance and next shortest distance are obtained, the related Relation Map function is obtained. The final visual effect is shown in FIG. 15.

The method to obtain the Relation Map function by the directional relation of the seed pointing to the closest edge can be obtained in the similar way. The Relation Map is obtained by the above-mentioned shortest distance method, except that the d value is replaced by the vector $V(v_x, v_y)$.

Figure 16:
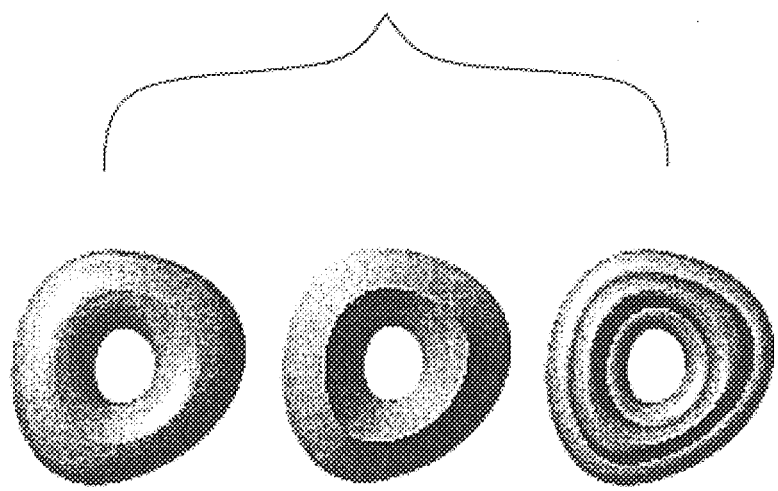
FIG. 16 shows different visual effects after using plural RMs and ERMs, wherein the lights are projected from different directions according to the present invention.
Figure 17:
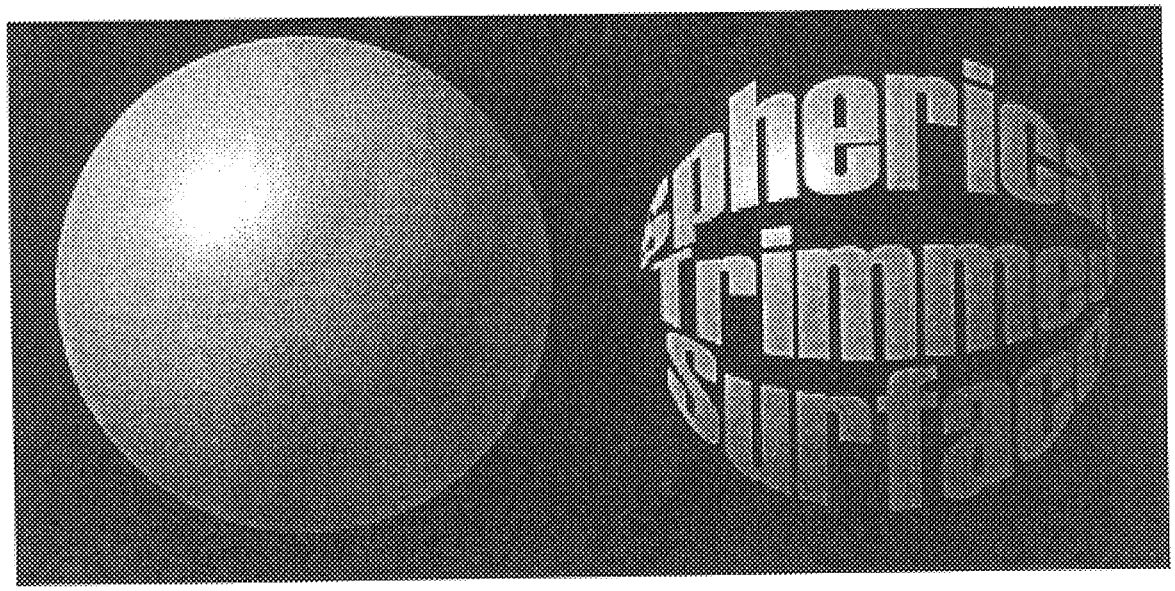
FIG. 17 shows the combination of plural visual effects on a two-dimensional original image according to the present invention.

A 3-D visual effect is desired on a 2-D original image Every pixel on the original figure has a height h and h is the vector $(v_x, v_y)$ corresponding to the pixel. For example, $h=L \times \tan(\mathrm{acos}(1-L/d_{max})$, wherein $L=[(v_x)^2+(v_y)^2]^{1/2}$. By the Relation Map function resulting from $V(v_x, v_y)$ and h and the well-known ERM, the 3-D effect of the light projected from different directions is generated as shown in FIG. 16.

For some special original image such as circles and ellipse, because the relationship between the seeds and the edges is very simple, the time for obtaining the Relation Map function can be largely spared. Thus, compared to the polygonal method, the present method to produce the visual effects uses much less time.

For the same original figure, by using plural different RM and ERM operations, we can obtain combined visual effects on a two-dimensional original image, as shown in FIG. 15.

Figure 21:
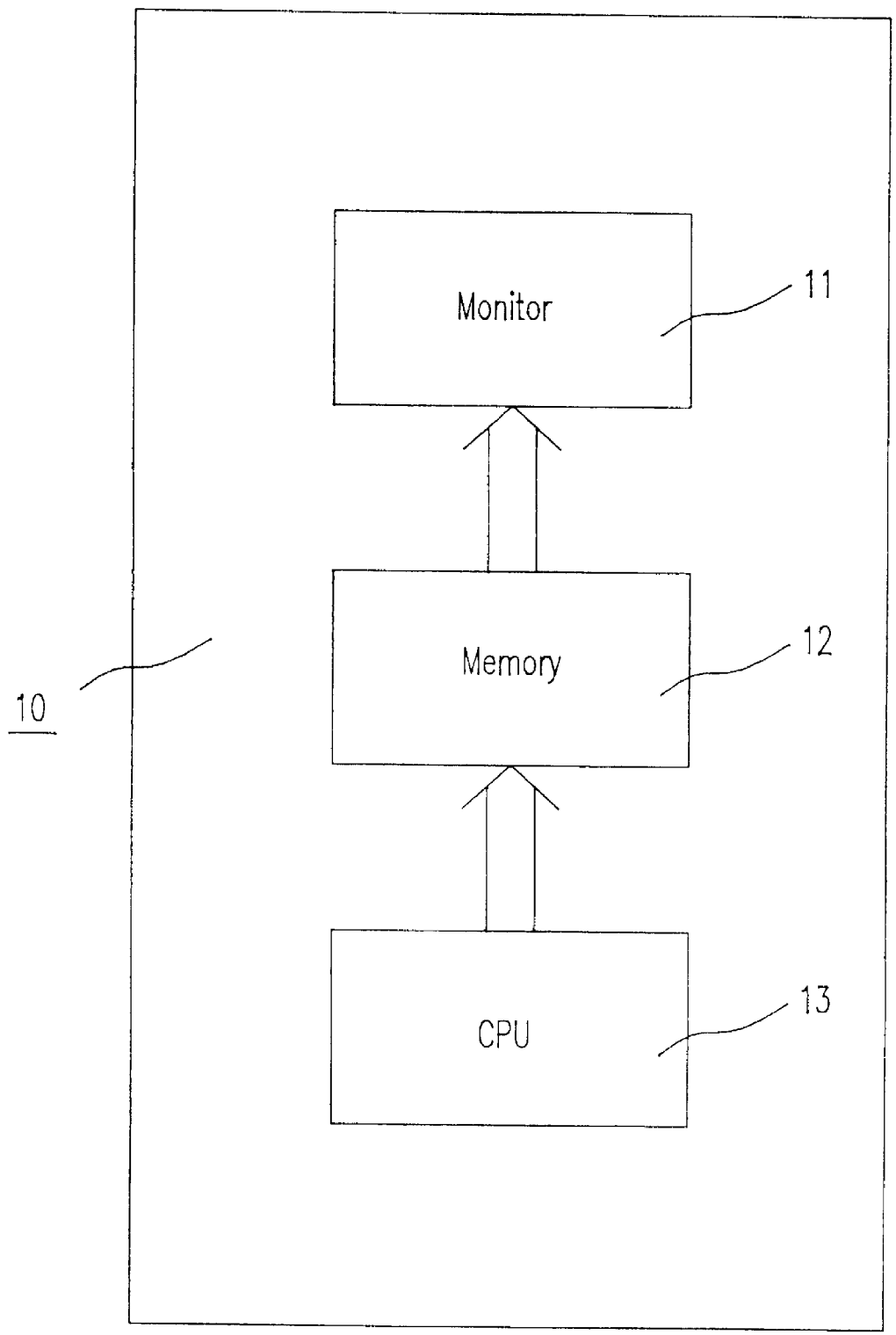
FIG. 21 is a schematic view showing a computer system in which a method according to the present invention is to be executed.

As shown in FIG. 21, the method according to the present invention is to be executed in a computer system 10 including a monitor 11, a memory 12 and a CPU 13. The digital data corresponding to the color value of every pixel on monitor 11 is stored in memory 12 to be processed by CPU 13 according to the present method and then sent back to memory 12 for display on monitor 11. Since it is readily apparent for one skilled in the art to know how the present method is operated in the computer system 10, no further description in this regard will be provided.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

Therefore, the above description and illustration should not be taken as limiting the scoop of the present invention which is defined by the appended claims.

What is claimed is:

1. A method for digitally processing an original image in an image processing system having a display, comprising the steps of:

providing said original image having a first set of coordinate points, wherein said points respectively have digital data;

defining said original image as a connection of edges approximating said original image, wherein endpoints of said edges are a second set of coordinate points;

performing a first operation on said first and second sets of coordinate points to obtain a relation map function corresponding to said first set of coordinate points;

performing a second operation on said digital data of said first set of coordinate points associated with said relation map function to process said image.

2. A method as set forth in claim 1 wherein said first set of coordinate points are a set of pixels on said display and said digital data includes color value data.

3. A method as set forth in claim 2 wherein said second set of coordinate points are selected from the pixels located close to points of said first set but not points of said first set.

4. A method as set forth in claim 3 wherein said first operation comprises the steps of: obtaining a distance from every pixel of said first set to the corresponding edge located closest thereto; and obtaining said relation map function representing said distance from said every pixel of said first set to said corresponding edge located closest thereto.

5. A method as set forth in claim 4 wherein said second operation comprises the steps of:

providing an effect on relation map function;

inputting a respective said color value data of every pixel of said first set and a corresponding relation map function thereof into said effect on relation map function to change said color value data of every pixel of said first set; and replacing said original color value with said changed color value data.

6. A method as set forth in claim 3 wherein said first operation comprises the steps of:

obtaining a vector from every pixel of said first set to a corresponding said edge located closest thereto; and obtaining said relation map function representing said vector from every pixel of said first set to said corresponding edge located closest thereto.

7. A method as set forth in claim 6 wherein said second operation comprises the steps of:

providing an effect on relation map function; inputting a respective said color value data of every pixel of said first set and a corresponding relation map function thereof into said effect on relation map function to change said respective color value data of every pixel of said first set; and replacing said original color value with said changed color value data.

8. A method as set forth in claim 1 wherein said display is a display monitor.

* * * * *